July 29, 1958  J. A. PURCELL ET AL  2,845,546
AMPLITUDE DISCRIMINATOR
Filed Dec. 29, 1954

INVENTORS
JOSEPH A. PURCELL
HAROLD J. BEAL
BY
ATTORNEY

United States Patent Office 2,845,546
Patented July 29, 1958

2,845,546

AMPLITUDE DISCRIMINATOR

Joseph A. Purcell, Endwell, and Harold J. Beal, Apalachin, N. Y., assignors to International Business Machines Corporation, New York, N. Y., a corporation of New York Application December 29, 1954, Serial No. 478,472

2 Claims. (Cl. 250—211)

This invention relates to a device for recording the displacement of a vibrating object and more particularly to recording the displacement of a vibrating object in the output voltage of a photosensitive transistor.

As part of a procedure for testing equipment and particularly electrical equipment, it is desirable to test the performance of the equipment under highly vibratory conditions for a period of time. The purpose of this test procedure is the determination of the ability of the equipment to withstand vibration for a specified period without degradation of the output characteristics of the equipment. To test the vibration resistant qualities of such equipment, vibratory motion is imparted to the equipment by standard electromagnetic vibration devices, such as produced by the Calidyne Manufacturing Company of Worcester, Massachusetts. This type of vibrator operates by moving an alternating current coil in a magnetic field by repeated fluctuation of the current in the field coil to cause vibratory motion. This vibratory motion is imparted to the subject of the test by placing the tested equipment in contact with the vibration device.

In conducting vibration tests, it is important to be able to detect the presence and the amplitude of the displacement of the vibration, so as to determine the extent of vibratory motion that the tested equipment is subject to. The amount of displacement caused by the vibration in some vibratory tests of electrical equipment is so minute that it is impossible to measure the displacement conveniently with present existing means.

It is desirable to be able to measure the amplitude of this minute displacement of a vibrating or reciprocating object.

It is the purpose of this invention to employ the sensitivity of photo-sensitive transistors to the movement of a light beam at or near the junction between the zones in the transistor to detect minute displacements of a vibrating object.

It is an object of this invention to provide a device in which a calibrated output voltage records the displacement of a vibrating object.

It is another object of this invention to provide apparatus for reflecting the vibration of an object in the variation of the output voltage of a photo-sensitive transistor.

A further object of this invention is to provide a photo-sensitive transistor mounted on a reciprocating object to record the vibration of the object in the output voltage of the transistors.

As another object of this invention, it is intended to provide a linear output voltage for measuring the displacement of a vibrating object.

A still further object of this invention is the provision of a simple apparatus employing a photo-sensitive transistor, and a light beam to measure and record minute displacement of a vibrating object.

These and other objects of this invention will become more apparent upon consideration of the following description, taken together with the accompanying drawings, in which.

In general, this invention provides a combination of a photo-sensitive transistor mountable on a vibratory object and a light beam incident upon said photo-sensitive transistor at or near the junction between the zones of the transistor to controllably vary the conductivity between the end zones of the transistor. The output voltage of the transistor is proportional to the displacement of the light beam from the junction and reflects the displacement of the transistor by the vibration and consequently the displacement of the vibratory object.

Figure 1:
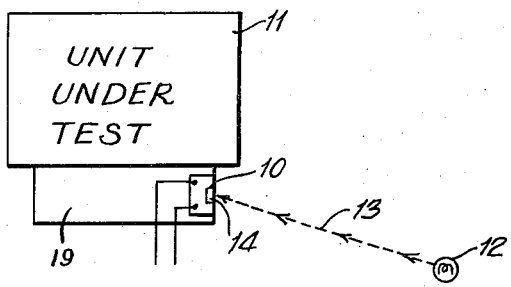
Figure 1 is a partially schematic plan view of a light source and photo-sensitive transistor, receiving said light, mounted on a vibratory object.

Fig. 1 shows a photo-transistor test fixture 10 mounted on an object 11 which is suitably vibratory. A light source 12 emits light rays 13 in a narrow beam which falls on a photo-transistor 14 of the test fixture 10. The test fixture 10 is mounted on the object under test by housing indicated by the numeral 19. The test fixture 10 is mounted on the vibratory object 11, so that the displacements of the fixture are in a plane. The light rays 13 fall on the test fixture in a pin point of light adjacent the junction of the zones of the photo-transistor 14. When the vibratory object is subjected to vibrations, the vibrations cause the test fixture 10 to move. The light ray 13 falling on the photo-transistor 14 adjacent the junction of the zones of opposite conductivity in the transistor 14 produces a current variation because of the movement of the light rays 13 with relation to the junction.

Figure 2:
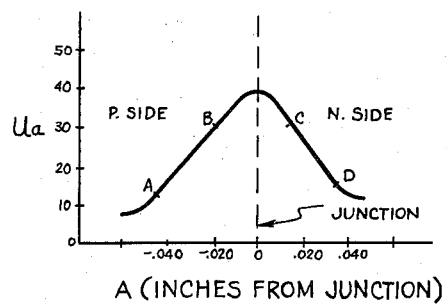
Fig. 2 is a graph portraying characteristics of the output voltage of the photo-sensitive transistor illustrated in Fig. 1.

The sensitivity profile of the photo-transistor 14 under the excitation of the light beam 13 is depicted in the graph of Fig. 2. This graph shows on the axis of the abscissa a zero point which represents the junction between the adjacent zones of opposite conductivity. On the axis of the ordinates, the graph shows variations in electric current in microamperes. On the abscissa the distance of the point of the incidence of the light beam 13 on the photo-transistor 14 from the junction between the zones of opposite conductivity is indicated in inches. A peak-shaped curve is described on the graph showing an increase in current with an approach of the light beam to the junction and a similar corresponding decrease in current as point of incidence of the light beam proceeds away from the junction. The peak of current flow, therefore, is reached with the incidence of the light beam 13 on the junction. It has been determined that the shape of the current flow curve on either the P-side or the N-side is substantially linear through a substantial field of travel of the light beam 13 on the photo-sensitive transistor 14. This linearity is indicated by the sector AB on the P-side and CD on the N-side of the curve shown in Fig. 2.

Figure 3:
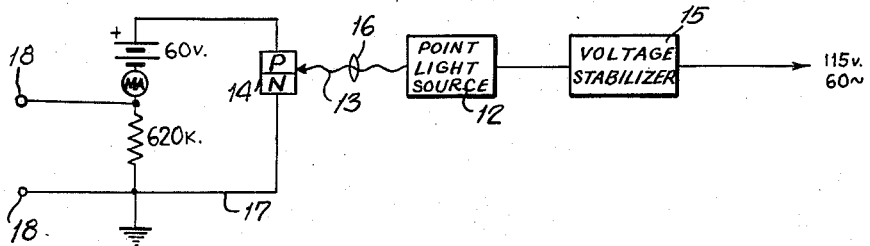
Fig. 3 is a block and schematic diagram depicting a circuit of this invention.

The resulting current variations are all detected according to this invention so that they may be displayed on conventional measuring devices. In Fig. 3, a circuit is shown for providing the pin point light beam 13 and the amplification.

The point light source 12 is fed a voltage by a voltage stabilizer 15. A lens system 16 focuses the pin point light rays 13 on the photo-transistor 14. The vibration of the photo-transistor 14 produces a fluctuating current of a magnitude and frequency determined by the vibration amplitude and frequency, the limits of which fall within one of the linear portions of the profile curves shown in Fig. 2. The output of the photo-transistor 14 produced by the current variation resultant from the motion of the light beam on the photo-transistor 14 is detected by a circuit 17. A milliammeter 20 detects and records the deflection by the indications in current variation. The circuit 17 has a pair of terminals 18 which are suitably connected to a suitable voltage responding device, such as a cathode ray oscilloscope or an alternating current responding vacuum tube voltmeter. The alternating voltage developed across the terminals 18 is measured by the voltage responding device to record the amplitude of the displacement caused by the object to which photo-transistor 14 is attached. Other conventional electronic matching and amplifying circuits may be used for obtaining the amplification of the current variation. The chief criteria required by the amplification apparatus is the provision of low noise levels in the apparatus.

The vibration of the object on which the test fixture 10 is mounted is measured and recorded by means of the current variations shown in the graph of Fig. 2, as described above. This variation in turn will provide a variation in the output voltage of the photo-transistor 14. The output voltage can be calibrated with relation to the degree of displacement to provide means for measuring displacement. This calibration can be established for any given test apparatus according to this invention, by fixing the photo-transistor 14 and sweeping the beam of light 13 at a known displacement on the surface of the photo-transistor 14 along one of the sectors of linearity, as described above. By constant increase of the displacement and concomitant measurement of the variation of the amplifier output voltage a calibration curve of output voltage against the beam of light 13 displacement may be plotted. This calibration curve provides a standard against which displacement of the test fixture 10 and consequently the vibratory object may be measured.

The profile curves of current variation under light excitation are linear, as shown in Fig. 2, and sensitive to temperature. With a sample photo-transistor mounted in a calibrating test fixture, the photo-transistor, calibrated according to this invention, was displaceable in known increments with an accuracy of plus or minus .0002. The beam of light focused on the sample photo-transistor immediately adjacent the junction was displaced by displacement of the photo-transistor in desired increments. The displacement increments and the current variations were recorded to provide profile curves of the nature shown in Fig. 2. The calibration procedure was conducted at 27° C. and at 35° C. At both temperatures linearity of the curves was observed. The following table shows the sensitivity of the photo-transistor at 27° C. and 35° C. in terms of current variation for displacement of 0.001 from the transistor junction.

*Sensitivity tabulation*

|  | n side | | p side | |
| --- | --- | --- | --- | --- |
|  | 27° C. | 35° C. | 27° C. | 35° C. |
|  | .001″ | .001″ | .001″ | .001″ |
| Phototransistor #1 —u. amp.. | 3.5 | 5.1 | 3.3 | 5.2 |
| Phototransistor #2 —u. amp.. | 2.1 | 3.0 | 2.3 | 5.0 |

This table indicates suitable sensitivity at 35° C. for displacement of .001 inch. Variations in the ambient temperature may be avoided by maintaining the photo-transistor at a constant temperature of around 40° C. This is desirable as variation of the slope of the profile curve with temperature variation is undesirable. Apparently, the limiting factor for the practical measurement of minute amplitudes of vibration with the device of this invention is the diameter of the beam of light striking the transistor elements.

The photo-transistor in the device of this invention may be a type X-4 photo-transistor as produced by Phototransistor Products Company. The point light source may be a zirconium light source, such as GZ2U of Gates Inc.

It will be readily understood that the modifications of the above embodiment may be made within the spirit of this invention. Various substitution of components are possible.

This invention may be utilized to advantage in monitoring the degree of displacement of a vibrating object and to detect changes in the degree. This invention is available in any application of a control to the degree of displacement of a vibrating object. It is also useful in automatically measuring and recording the degree of displacement of a vibrating object and the variations in the degree of displacement of a vibrating object. Thus, it is possible with the device of this invention to observe and record the vibration of equipment, such as electrical equipment, which is being subject to a vibration test.

The embodiment of the invention shown in the drawings and set forth in the above description is for the purpose of illustration only and it will be readily understood that this specific embodiment may be modified without departure from the scope of this invention which is intended to be limited solely by the following claims:

What is claimed is:

1. Apparatus for measuring the vibrations of a vibratory object that comprises a source of light providing a small cross sectional area beam of constant intensity, a junction phototransistor positioned to receive said beam on a limited area thereof adjacent to but removed from said junction, means to apply a voltage across said phototransistor to produce a normal output current therein, means to displace said beam in said limited area as a function of the vibration of said object to modulate said output current, the amplitude of said voltage across said phototransistor being sufficient to provide a substantially linear modulated current output response characteristic for a significant portion of said limited area, the amplitude of said modulation being a linear function of the magnitude of displacement of said beam from said junction and means to measure said modulated output current as a measure of the vibrations of said object.

2. Apparatus for measuring the vibrations of a vibratory object that comprises a source of light to provide a small cross sectional area beam of constant intensity, a junction phototransistor carried by said object and positioned to receive said beam on a limited area thereof adjacent to but removed from said junction, the cross sectional area of said beam being small with relation to said limited area, means to apply a voltage across said phototransistor to produce a normal output current therein, the vibrations of said object causing said beam to be displaced in said limited area to modulate said output current, the amplitude of said voltage across said phototransistor being sufficient to provide a substantially linear modulated current output response characteristic for a significant portion of said limited area, the magnitude of said beam displacement being a function of the magnitude of said vibrations and the amplitude of said modulation being a linear function of the magnitude of the displacement of said beam from said junction and means to measure said modulated output current as a measure of the vibrations of said object.

References Cited in the file of this patent

UNITED STATES PATENTS

| 1,793,403 | Hutt | Feb. 17, 1931 |
| 2,356,579 | Gardner | Aug. 22, 1944 |
| 2,570,978 | Pfann | Oct. 9, 1951 |
| 2,740,901 | Graham | Apr. 3, 1956 |